UNITED STATES PATENT OFFICE

1,922,480

MANUFACTURE OF AMINO-HYDROXY-ANTHRAQUINONES

Erich Koehler, Leverkusen-on-the-Rhine, Germany, assignor to General Aniline Works, Inc., New York, N. Y., a Corporation of Delaware No Drawing. Application June 27, 1930, Serial No. 464,419, and in Germany June 28, 1929

10 Claims.  (Cl. 260—59)

This invention relates to the manufacture of amino-hydroxyanthraquinones and substitution products thereof.

As is known, aminohydroxyanthraquinones are produced in general from hydroxy anthraquinones by nitration and reduction or from aminoanthraquinones by hydroxylation by means of oleum or sulfuric acid or by oxidation in sulfuric acid solution, as also by the rearrangement of the hydroxylamines by concentrated sulfuric acid and the like.

While all the above methods are effected by the conversion of anthraquinone derivatives, amino-hydroxy anthraquinones or substitution products thereof are obtained in accordance with the present invention directly from aminophenol derivatives. The process of manufacture in accordance with the invention is by causing an acyl-amino phenol, which may be alkylated in the hydroxy group or a nuclear substitution product thereof containing two unsubstituted vicinal positions to act at elevated temperature, say between 100 and 200° C. for about half an hour to several hours on phthalic acid anhydride or a halogen substitution product thereof in the presence of a condensation agent, for example aluminum halogenides, in particular aluminium chloride, a mixture of aluminium chloride with sodium chloride or with pyridine and the like, and if desired, in a high-boiling organic inert solvent; if necessary, the ring closure of any intermediately produced carboxylic acid with the formation of the anthraquinone nucleus is carried out in the customary manner by heating for several hours to about 100–130° C. in concentrated or rather concentrated, say 90–100%, sulfuric acid, if desired, with the addition of boric acid, thereby at the same time saponification of the acylamino group being effected. In case there is started with an alkoxy acylamino benzene, the splitting up of the alkoxy group probably enters in the first stage of reaction.

The process proceeding in two steps can be represented by the following scheme:

(I)

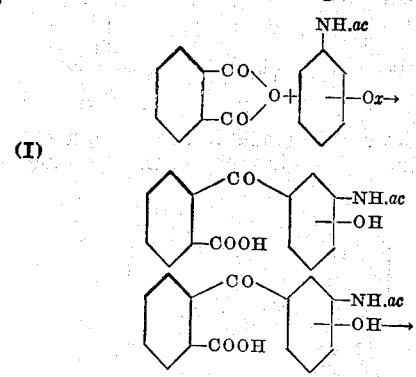

(II)

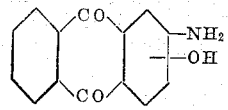

($ac$=an organic acyl radical, such as benzoyl, acetyl, the group—$CO.NH.C_6H_5$, $x$=hydrogen or alkyl)

As an example, the di-carboxybenzoyl-derivative of dihydroxy-diphenyl urea is obtained from 2.2'-dimethoxydiphenyl urea and phthalic acid anhydride. On heating with concentrated sulfuric acid carbon dioxide is split off and 2-amino-3-hydroxyanthraquinone is obtained as the principal product together with a little 1-amino-2-hydroxy-anthraquinone. These two isomers can be separated by means of the different solubility of their sulfates.

In a similar manner the reaction proceeds in the case of p-benzoylamino-phenol. In this case the 1.4-aminohydroxyanthraquinone can be obtained in one process without isolating the benzoyl-benzoic acid compound. By heating with sulfuric acid the benzoyl group is split off from the amino group and pure 1.4-aminohydroxyanthraquinone of the melting point 208° C. is produced. The quantities of the two components, phthalic acid anhydride and acylamino phenol, may be varied within wide limits; according to the probable course of the reaction, generally molecular proportions are necessary, but generally I am working with an excess of phthalic acid anhydride, the preferred method of carrying out my process consisting in working in a melt of aluminium chloride and sodium chloride.

The aminohydroxyanthraquinones thus obtainable are intended to find application as intermediate products for the manufacture of anthraquinone dyestuffs.

The invention is illustrated by the following examples, without being limited thereto:

Example 1

A powdered mixture of 13.8 parts by weight of 2.2'-dimethoxy-diphenyl urea of the formula

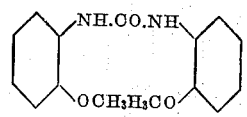

and 50 parts by weight of phthalic acid anhydride is introduced at 100° C. into a mixture of 200 parts by weight of aluminium chloride and 40 parts by weight of common salt. When the development of hydrochloric acid is complete, the melt is decomposed with water and hydrochloric acid and the residue boiled several times with water until the phthalic acid is removed. The residue, which is insoluble in water, is treated with dilute sodium carbonate solution, whereby the carboxylic acid goes into solution. By acidification it again separates and has the melting point 188° C. The product thus obtained probably corresponds to the formula

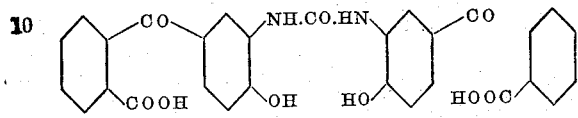

Ring closure and saponification take place by heating with 96% sulfuric acid at 125–135° C. On then reducing the sulfuric acid to a content of 80% the sulfate of 2.3-aminohydroxyanthraquinone of the formula

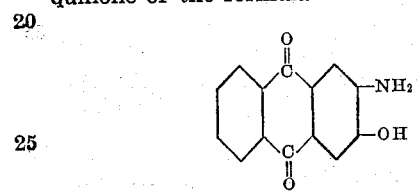

crystallizes out in fine small needles. By diluting the acid filtrate with water 1.2-aminohydroxyanthraquinone of the formula

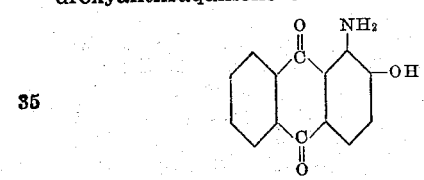

can be obtained.

*Example 2*

A mixture of 60 parts by weight of 1-benzoylamino-4-phenol of the formula

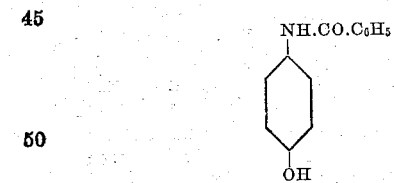

and 150 parts by weight of phthalic acid anhydride is introduced at 100° C. into a melt of 500 parts by weight of aluminium chloride and 100 parts by weight of common salt. The mixture is then heated at 120–130° C. until the development of hydrochloric acid is complete, and after cooling is worked up as described in Example 1. A small quantity of carboxylic acid is obtained as a secondary product. The principal product is 1-benzoylamino-4-hydroxy-anthraquinone of the formula

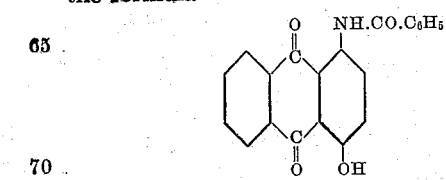

which can be recrystallized from nitrobenzene or used directly for the saponification. The saponification is carried out by heating with 96% sulfuric acid at 90–95° C. The sulfate separates out on dilution with water and by heating with water it yields 1-amino-4-hydroxyanthraquinone of the formula

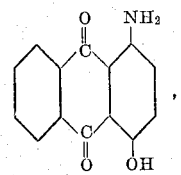

melting at 208° C.

*Example 3*

A mixture of 10 grams of o-dimethoxy-diphenyl urea of the formula

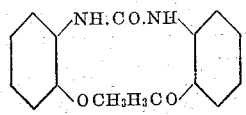

and 15 grams of 3-chlorophthalic acid anhydride of the formula

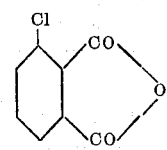

is added to a melt of 100 grams of aluminium chloride and 20 grams of common salt at a temperature of 110–120° C.; the temperature is kept at 120–130° C. for about 20 minutes, and after cooling, the melt is decomposed with ice and hydrochloric acid, boiled up and the separated precipitate is filtered. The filter residue is boiled with soda solution, until nearly the whole mass has dissolved. The filtrate is rendered weakly acid with diluted acetic acid and boiled with animal charcoal, the urea derivative of the 2-(3'-amino-4'-hydroxy-(methoxy-?) benzoyl)-6-chloro-benzoic acid formed being precipitated with hydrochloric acid while boiling. The solid and filtered acid is dissolved in glacial acetic acid and the mass is boiled with animal charcoal until the filtrate has only a pale yellowish-brown coloration. Then the acid is precipitated with water, dissolved in hot diluted soda lye and rendered weakly acid with glacial acetic acid. By the addition of animal charcoal and acidifying the filtrate with hydrochloric acid the pure benzoylbenzoic acid compound is obtained which separates in colorless crystals, containing crystal water and melting at 274–276° C. with decomposition. In diluted alkalies it dissolves with a pale yellow coloration. It probably corresponds to the formula

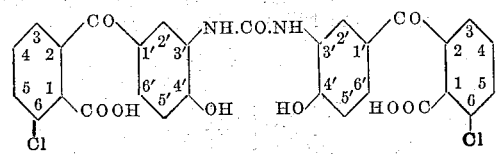

The ring closure of this acid to the 2-amino-3-hydroxy-5-chloroanthraquinone of the formula

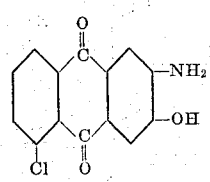

easily takes place by heating in a mixture of concentrated sulfuric acid and boric acid to 130° C. for about 2-3 hours. After diluting the sulfuric acid solution to about 75-80%, the sulfate of 2 - amino - 3-hydroxy-5-chloroanthraquinone crystallizes on cooling in small, nearly colorless needles. On sucking off and washing with sulfuric acid of 60° Bé., then rendering alkaline with soda lye and precipitating with glacial acetic acid while boiling, the sulfate is obtained in small, brownish red needles which decompose at 333° C. In sulfuric acid it dissolves with a yellow coloration, on adding formaldehyde there is no change in coloration. It dissolves in pyridine with a yellowish orange coloration which by the addition of water and caustic soda lye turns to dirty-violet; the vat with pyridine has a light yellow and with caustic soda lye an orange to brownish-yellow coloration.

Example 4

To a solution of 31.2 grams of the urea compound from chloroanisidine of the formula

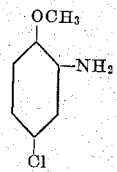

and 29.2 grams of phthalic acid anhydride in 500 ccm. of trichlorobenzene there are added 117.5 grams of aluminium chloride at 60-80° C., whereby the reaction mixture becomes solid with development of hydrochloric acid and becoming dark. Then the mass is slowly heated to 140° C. and kept at this temperature for about 2-3 hours; after cooling, the melt is decomposed with concentrated hydrochloric acid and water, the trichlorobenzene is distilled off with steam and the resinous residue is boiled up with soda solution, whereby only small quantities of the corresponding benzoylbenzoic acid compound dissolve. The solid residue, being insoluble in soda solution, is the ring-closed anthraquinone derivative; it is washed, dried and saponified by heating for 2-3 hours to 100-110° C. in 10 times its quantity of concentrated sulfuric acid with the addition of boric acid. After cooling the reaction mass is filtered and the 1-hydroxy-2-amino-4-chloro-anthraquinone of the formula

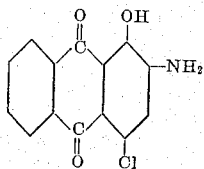

is precipitated by pouring the filtrate into water, it is filtered, washed and dried. Small, brownish-red needles of the melting point 254-255° C. are obtained by recrystallization from 50-60 parts of 1.2-dichlorobenzene.

In sulfuric acid the compound dissolves with an orange yellowish coloration which on addition of formaldehyde turns to pale green; in pyridine it dissolves with an orange red coloration which by adding water and caustic soda lye turns to crimson red; the vat prepared with pyridine is yellow and with caustic soda lye orange to brownish yellow.

Example 5

In the same manner as described in Example 4 the urea of ortho-carboxy-benzoyl cresidine corresponding to the formula

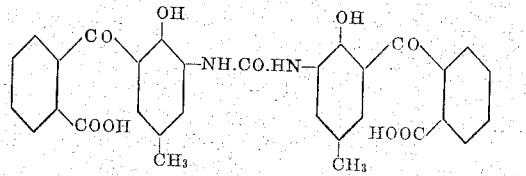

is condensed to the 1-hydroxy-2-amino-4-methylanthraquinone, the benzoylbenzoic acid compound thus formed not being completely ring-closed. The residue insoluble in soda solution is saponified with sulfuric acid; the sulfuric acid solution is filtrated, precipitated with water and the dried precipitate is dissolved in 10 parts of pyridine, boiled with animal charcoal and filtered. On cooling small quantities of brown colored leaflets dissolving in sulfuric acid with a violet coloration and decomposing at a temperature of 270-280° C. separate, probably being urea derivative not completely saponified. The 1-hydroxy-2-amino-4-methyl-anthraquinone of the formula

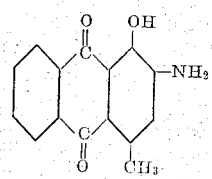

is precipitated with water and glacial acetic acid from the pyridine mother liquor and after drying it crystallizes from 1.2-dichlorobenzene in feathery clusters of the melting point 204-205° C.

In sulfuric acid it dissolves with a yellow coloration which by adding formaldehyde shows no alteration; in pyridine it dissolves with a red coloration, which on the addition of water and caustic soda lye turns to a bluish-red coloration. The vat prepared with pyridine has a yellow and with caustic soda lye a brownish-yellow coloration.

I claim:

1. In the process of preparing aminohydroxy-anthraquinones the step which comprises causing an acyl amino phenol, which may be substituted in the hydroxy group by an alkyl group and in the nucleus by a substituent of the group consisting of halogen atoms and alkyl groups, but containing two unsubstituted vicinal positions, to act on at least equimolecular quantity of phthalic acid anhydride which may be substituted by halogen at a temperature between 100 and 200° C. in the presence of a condensing agent for half an hour to several hours.

2. In the process of preparing aminohydroxy-anthraquinones the step which comprises causing an acyl amino phenol, which may be substituted in the hydroxy group by an alkyl group and in the nucleus by a substituent of the group consisting of halogen atoms and alkyl groups, but containing two unsubstituted vicinal positions, to act on an at least equimolecular quantity of phthalic acid anhydride which may be substituted by halogen at a temperature between 100 and 200° C. in the presence of a condensing agent for half an hour to several hours and with the addition of an inert organic high-boiling solvent.

3. In the process of preparing aminohydroxy-anthraquinones the step which comprises heating an acyl amino phenol, which may be substituted in the hydroxy group by an alkyl group and in the nucleus by a substituent of the group consisting of halogen atoms and alkyl groups, but containing two unsubstituted vicinal positions, to act on an at least equimolecular quantity of phthalic acid anhydride which may be substituted by halogen at a temperature between 100 and 200° C. in the presence of aluminium chloride for half an hour to several hours.

4. In the process of preparing aminohydroxyanthraquinones the step which comprises heating an acyl amino phenol, which may be substituted in the hydroxy group by an alkyl group and in the nucleus by a substituent of the group consisting of halogen atoms and alkyl groups, but containing two unsubstituted vicinal positions, to act on an at least equimolecular quantity of phthalic acid anhydride which may be substituted by halogen at a temperature between 100 and 200° C. in a melt consisting of aluminium chloride and sodium chloride for half an hour to several hours.

5. In the process of preparing aminohydroxyanthraquinones the step which comprises causing 13.8 parts by weight of 2.2'-dimethoxy-diphenyl urea to act on 50 parts by weight of phthalic acid anhydride at a temperature of 100° C. in a melt consisting of 200 parts by weight of aluminium chloride and 40 parts by weight of common salt, until development of hydrochloric acid has ceased.

6. The process of preparing aminohydroxyanthraquinones which comprises causing an acyl amino phenol, which may be substituted in the hydroxy group by an alkyl group and in the nucleus by a substituent of the group consisting of halogen atoms and alkyl groups, but containing two unsubstituted vicinal positions, to act on an at least equimolecular quantity of phthalic acid anhydride which may be substituted by halogen at a temperature between 100 and 200° C. in the presence of a condensing agent for half an hour to several hours, and effecting the ring closure to form the anthraquinone nucleus by heating the condensation product with strong sulfuric acid.

7. The process of preparing aminohydroxyanthraquinones which comprises causing an acyl amino phenol, which may be substituted in the hydroxy group by an alkyl group and in the nucleus by a substituent of the group consisting of halogen atoms and alkyl groups, but containing two unsubstituted vicinal positions, to act on an at least equimolecular quantity of phthalic acid anhydride which may be substituted by halogen at a temperature between 100 and 200° C. in the presence of a condensing agent for half an hour to several hours and with the addition of an inert organic high-boiling solvent, and effecting the ring closure to form the anthraquinone nucleus by heating the condensation product with strong sulfuric acid.

8. The process of preparing aminohydroxyanthraquinones which comprises heating an acyl amino phenol, which may be substituted in the hydroxy group by an alkyl group and in the nucleus by a substituent of the group consisting of halogen atoms and alkyl groups, but containing two unsubstituted vicinal positions, to act on an at least equimolecular quantity of phthalic acid anhydride which may be substituted by halogen at a temperature between 100 and 200° C. in the presence of aluminium chloride for half an hour to several hours, and effecting the ring closure to form the anthraquinone nucleus by heating the condensation product with strong sulfuric acid.

9. The process of preparing aminohydroxyanthraquinones which comprises heating an acyl amino phenol, which may be substituted in the hydroxy group by an alkyl group and in the nucleus by a substituent of the group consisting of halogen atoms and alkyl groups, but containing two unsubstituted vicinal positions, to act on an at least equimolecular quantity of phthalic acid hydride which may be substituted by halogen at a temperature between 100 and 200° C. in a melt consisting of aluminium chloride and sodium chloride for half an hour to several hours, and effecting the ring closure to form the anthraquinone nucleus by heating the condensation product with strong sulfuric acid.

10. The process of preparing aminohydroxyanthraquinones which comprises causing 13.8 parts by weight of 2.2'-dimethoxy-diphenyl urea to act on 50 parts by weight of phthalic acid anhydride at a temperature of 100° C. in a melt consisting of 200 parts by weight of aluminium chloride and 40 parts by weight of common salt, until development of hydrochloric acid has ceased, and effecting the ring closure to form the anthraquinone nucleus by heating with 96% sulfuric acid at 125–135° C.

ERICH KOEHLER.